United States Patent
Yoshida

[11] Patent Number: 6,092,385
[45] Date of Patent: Jul. 25, 2000

[54] COOLING UNIT FOR VEHICLE AIR CONDITIONER

[75] Inventor: Satoshi Yoshida, Kariya, Japan

[73] Assignee: Denso Corporation, Kariya, Japan

[21] Appl. No.: 09/268,777

[22] Filed: Mar. 16, 1999

[30] Foreign Application Priority Data

Mar. 17, 1998 [JP] Japan .................................. 10-067274
Feb. 18, 1999 [JP] Japan .................................. 11-040287

[51] Int. Cl.[7] .................................................. F25D 21/00
[52] U.S. Cl. ............................... 62/272; 62/317; 62/285; 62/288; 62/298
[58] Field of Search ............................ 62/317, 285, 288, 62/298, 272

[56] References Cited

U.S. PATENT DOCUMENTS

| | | | |
|---|---|---|---|
| 2,746,262 | 5/1956 | Gallo | 62/7 |
| 2,751,760 | 6/1956 | Williams | 62/317 |
| 2,945,360 | 7/1960 | Tyler | 62/317 |
| 3,021,692 | 2/1962 | Gaugler | 62/271 |
| 3,575,009 | 4/1971 | Kooney | 62/272 |
| 5,511,386 | 4/1996 | Russ et al. | 62/285 |
| 5,857,353 | 1/1999 | Schneider et al. | 62/404 |

FOREIGN PATENT DOCUMENTS 6-135220 5/1994 Japan .

Primary Examiner—Henry Bennett
Assistant Examiner—Mark Shulman
Attorney, Agent, or Firm—Harness, Dickey & Pierce, PLC

[57] ABSTRACT

A cooling unit has a cooling casing for forming an air passage, and a cooling heat exchanger disposed in the cooling casing. The cooling casing is composed of upper and lower cases detachably connected to each other in an up-down direction on a connection portion therebetween. The lower case has a first end surface on the connection portion at an inside of the cooling casing, and a protrusion portion protruding toward the upper case from the first end surface. On the other hand, the upper case has a second end surface contacting the first end surface on the connection portion, and a recess portion into which the protrusion portion is fitted. Further, a step portion downwardly stepped from the first end surface is formed in the lower case on an inside of the protrusion portion at a position proximate to the opening portion. Thus, a space is formed under the second end surface of the upper case. As a result, condensed water entered into a clearance between the first end surface of the lower case and the second end surface of the upper case falls downwardly through the space.

20 Claims, 5 Drawing Sheets

COOLING UNIT FOR VEHICLE AIR CONDITIONER

CROSS-REFERENCE TO RELATED APPLICATION

This application is related to and claims priority from Japanese Patent Applications No. Hei 10-67274 filed on Mar. 17, 1998, and No. Hei 11-40287 filed on Feb. 18, 1999, the contents of which are hereby incorporated by reference.

BACKGROUND OF THE INVENTION

1. Field of the Invention

The present invention relates to a cooling unit for a vehicle air conditioner. More particularly, the present invention relates a cooling casing for accommodating a cooling heat exchanger of the cooling unit, which can be divided into upper and lower cases.

2. Description of Related Art

JP-A-6-135220 describes a cooling casing for accommodating an evaporator. As shown in FIG. 8, the cooling casing is divided into an upper case 100 and a lower case 101. A recess portion 105 is formed in the upper case 100, and a protrusion portion 106 fitted into the recess portion 105 is formed in the lower case 101. Further, the upper case 100 has a protrusion portion 103 which protrudes toward an inner lower side of the cooling casing from a connection portion (i.e., connection surface) 107 between the upper and lower cases 100, 101. On the other hand, an elastically deformed seal member is formed on a bottom of the lower case 101. Thus, when the upper and lower cases 100, 101 are assembled, the seal member 104 is deformed by the protrusion portion 103. As a result, it can prevent condensed water generated from the evaporator from being leaked to the outside of the cooling casing from the connection portion 107 between the upper and lower cases 100, 101. However, because it is necessary to provide the seal member 104 in the conventional cooling casing, components of the cooling casing are increased and assembling steps there of are also increased.

SUMMARY OF THE INVENTION

In view of the foregoing problems, it is an object of the present invention to provide an air conditioner having a cooling casing composed of an upper case and a lower case which are detachably connected to each other to restrict condensed water from being leaked to an outside of the cooling casing from a connection portion between the upper and lower cases with a simple structure.

It is an another object of the present invention to provide an air conditioner having an upper case and a lower case, which restricts condensed water from being leaked to an outside from an opening portion of the upper and lower cases.

To achieve the object of the present invention, the inventors of the present invention experiment ally produced a cooling unit in which a seal member is not provided in upper and lower cases 200, 201, and studied a flow of condensed water in a connection portion (i.e., connection surface) between the upper and lower cases 200, 201, as shown in FIG. 7. An upstream air side of the cooling unit is connected to an inside/outside air unit for selectively introducing inside air or outside air, and a downstream air side of cooling unit is connected to a temperature adjustment unit for adjusting temperature of air. Therefore, when the upper and lower cases 200, 201 are assembled, an opening portion 207 as a connection port for connecting the inside/outside air unit or the temperature adjustment unit is formed. The lower case 201 has a protrusion portion 203 protruding from a base end surface 202. When condensed water flows into a clearance between the base end surface 202 of the lower case 201 and a lower end surface (not shown) of the upper case 200, contacting the base end surface 202, the condensed water flows along the base end surface 202 as shown by arrow "b" in FIG. 7, and may flow into the opening portion 7 as shown by arrow "c" in FIG. 7. That is, condensed water between the base end surface 202 of the lower case 201 and the lower end surface of the upper case 200 flows as shown by arrow "b" in FIG. 7, due to capillary-tube principle.

Further, the inventors of the present invention fount out that the condensed water is also introduced into the opening portion 207 after being moved onto inner wall surfaces of the upper and lower cases by blown-air.

The present invention is invented from the above-described inspiration. According to the present invention, an air conditioner includes a cooling casing composed of upper and lower cases which are detachably connected to each other in an up-down direction on a connection portion therebetween, and a cooling heat exchanger accommodated within the cooling casing. The cooling casing has an opening portion through which an inside of the cooling casing communicates with an outside of the cooling casing, and the opening portion is formed when the upper and lower cases are assembled. The lower case has a first end surface on the connection portion at the inside of the cooling casing, and a protrusion portion protruding toward the upper case from the first end surface. On the other hand, the upper case has a second end surface contacting the first end surface at an inside of the protrusion portion, and a recess portion into which the protrusion portion is fitted. Further, the lower case has a step portion downwardly stepped from the first end surface on the inside of the protrusion portion at a position proximate to the opening portion. Thus, when condensed water enters between the first end surface of the lower case and the second end surface of the upper case, condensed water falls to an inner bottom surface of the lower case through the step portion. As a result, the step portion prevents condensed water introduced into a clearance between the first end surface and the second end surface from flowing into the opening portion. That is, the air conditioner can prevents condensed water being leaked to the outside of the cooling casing due to the capillary-tube principle, with simple structure of the step portion.

Preferably, the step portion has a first lower surface provided at a lower side of the first end surface, and a vertical surface connecting the first end surface and the first lower surface. Further, the step portion is formed on the inside of the protrusion portion so that a first space is formed between the second end surface of the upper case and the first lower surface when the upper and lower cases are assembled. Thus, condensed water between the first end surface of the lower case and the second end surface of the upper case flows into the first space through the step portion, and reaches to the first lower surface of the step portion. Further, the first lower surface is inclined downwardly toward the inside of the cooling casing. Therefore, condensed water falling onto the first lower surface flows toward an inner bottom of the lower case, and is prevented from being leaked to the outside of the cooling casing.

More preferably, the lower case has a second lower surface on the same surface as the first lower surface, the second lower surface is more adjacent to the opening portion than the protrusion portion and the first lower surface, the second lower surface is opposite to the second end surface of the upper case to form a second space therebetween, and the second space communicates with both of the first space and the opening portion. Therefore, even when condensed water flows across the protrusion portion and flows toward the opening portion, condensed water falls to the second lower surface due to the second space, and flows to an inner lower side of the cooling casing. As a result, it can sufficiently prevent condensed water from being leaked to the outside of the cooling casing.

Further, the upper case has a first vertical guide protruding from an inner wall surface of the upper case to extend in the up-down direction, and the first vertical guide is disposed between the cooling heat exchanger and the step portion in a lateral direction perpendicular to the up-down direction. The lower case has a second vertical guide protruding from an inner wall surface of the lower case to extend in the up-down direction, and the second vertical guide is disposed to be more adjacent to the opening portion than the step portion in the lateral direction so that the step portion is provided between the first vertical guide and the second vertical guide in the lateral direction. Thus, condensed water moved onto the inner wall surface of the upper case due to blown-air is prevented from flowing into the opening portion by the first vertical guide. That is, condensed water on the inner wall surface of the upper case is guided downwardly by the first vertical guide. Similarly, condensed water on the inner wall surface of the lower case is guided downwardly by the second vertical guide. Thus, the air conditioner of the present invention prevents the leakage of condensed water due to blown-air, while preventing the leakage of condensed water due to capillary-tube principle.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

Figure 1:
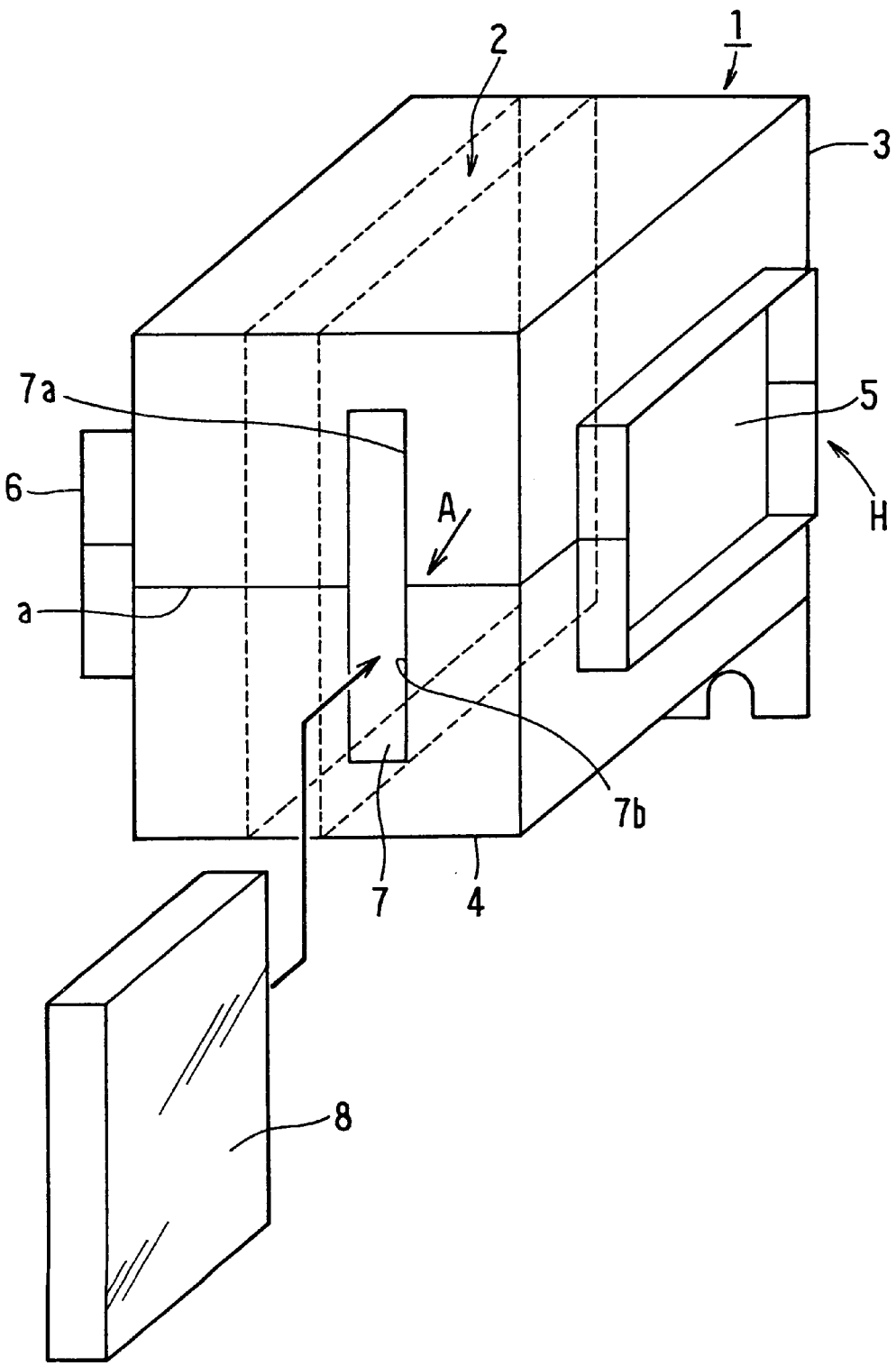
FIG. 1 is a schematic diagram showing a cooling unit for a vehicle air conditioner according to a first preferred embodiment of the present invention.

A first preferred embodiment of the present invention will be now described with reference to FIGS. 1–3. As shown in FIG. 1, a cooling unit 1 for cooling air is typically applied to a vehicle air conditioner. The cooling unit 1 includes a cooling casing for forming an air passage, and an evaporator 2 accommodated in the cooling casing. The evaporator 2 is a part of a refrigerant cycle mounted on the vehicle.

The cooling casing of the cooling unit 1 includes an upper case 3 and a lower case 4 divided into in an up-down direction. The upper case 3 and the lower case 4 are made of resin material having elasticity, such as polypropylene. In the first embodiment, the upper and lower cases 3, 4 are divided in the up-down direction along a division line "a" shown in FIG. 1. The division line "a" is a connection portion (i.e., connection surface) between the upper case 3 and the lower case 4.

The evaporator 2 is accommodated in the cooling casing of the cooling unit 1 to be sandwiched by the upper case 3 and the lower case 4 in the up-down direction. Refrigerant decompressed in an expansion valve disposed in the cooling unit 1 is introduced into the evaporator 2 through a refrigerant pipe. A part of the refrigerant pipe is accommodated in the cooling casing at an upstream air side of the evaporator 2.

A blower unit for introducing inside air (i.e., air inside the passenger compartment) and outside air (i.e., air outside the passenger compartment) is connected to the right side of the cooling unit 1 in FIG. 1. Air blown by the blower unit is introduced into the cooling unit 1 through an opening portion (i.e., air inlet, connection port) 5. The left side of the cooling unit 1 in FIG. 1 is connected to a temperature adjustment unit through an opening portion (i.e., air inlet, connection port) 6. The temperature adjustment unit adjusts temperature of air blown into the passenger compartment of the vehicle.

The blower unit includes a blower for blowing air into the passenger compartment, and an inside/outside air switching unit for selectively introducing inside air or outside air. Further, the temperature adjustment unit includes a heater core (i.e., heating heat exchanger) for heating air using an engine-cooling water, and air-mixing door for adjusting an amount of air passing through the heater core and an amount of air bypassing the heater core.

An opening portion 7 is formed in the cooling casing of the cooling unit 1 at an upstream air side of the evaporator 2. The opening portion 7 is composed of a recess portion 7a of the upper case 3 and a recess portion 7b of the lower case 4. That is, the recess portion 7a is placed at an upper side of the division line "a", and the recess portion 7b is placed at a lower side of the division line "a". The opening portion 7 are formed by assembling the upper case 3 and the lower case 4.

A rectangular filter 8 for removing dust contained in air is inserted into the cooling casing of the cooling unit 1 from the opening portion 7 as shown by the arrow in FIG. 1. Thereafter, the opening portion 7 is covered by a cover member so that the filter 8 is detachably held in the cooling casing of the cooling unit 1. Therefore, the filter 8 can be readily detached from the cooling casing of the cooling unit 1 after the cover member is removed, and the filter 8 can be readily changed.

Next, assembling structures of the upper case 3 and the lower case 4 will be now described. FIG. 2 is a perspective view of the cooling casing of the cooling unit 1 when view from arrow A in FIG. 1. FIG. 3 is a disassembled view of the upper case 3 and the lower case 4 in FIG. 2. In FIGS. 2, 3, "7c" indicates the opening periphery of the opening portion 7. As shown in FIGS. 2, 3, a protrusion portion 9 protruding toward the upper case 3 from the connection portion "a" between the upper and lower cases 3, 4 is integrally formed in the lower case 4 at a position proximate to the opening portion 7. An upper end portion of the lower case 4 is formed into a stepwise shape to form the protrusion portion 9. That is, the protrusion portion 9 protrudes from an inside base end surface 10 at an inside of the cooling casing, and an outside base end surface 11 at an outside of the cooling casing. In the first embodiment of the present invention, both of the base end surfaces 10, 11 are provided on the same flat surface.

On the other hand, an insertion portion 12 into which the protrusion portion 9 is fitted is provided in the upper case 3. As shown in FIG. 3, the insertion portion 12 is formed integrally with the upper case 3 to be recessed from a lower end surface of the upper case 3 and to be engaged with the protrusion portion 9. The insertion portion 12 has an inside contacting surface 13 provided inside the cooling casing, and an outside contacting surface 14 provided outside the cooling casing. When the upper case 3 and the lower case 4 are assembled so that the protrusion portion 9 is fitted into the insertion portion 12, the inside contacting surface 13 contacts the inside base end surface 10, and the outside contacting surface 14 contacts the outside base end surface 11.

Figure 2:
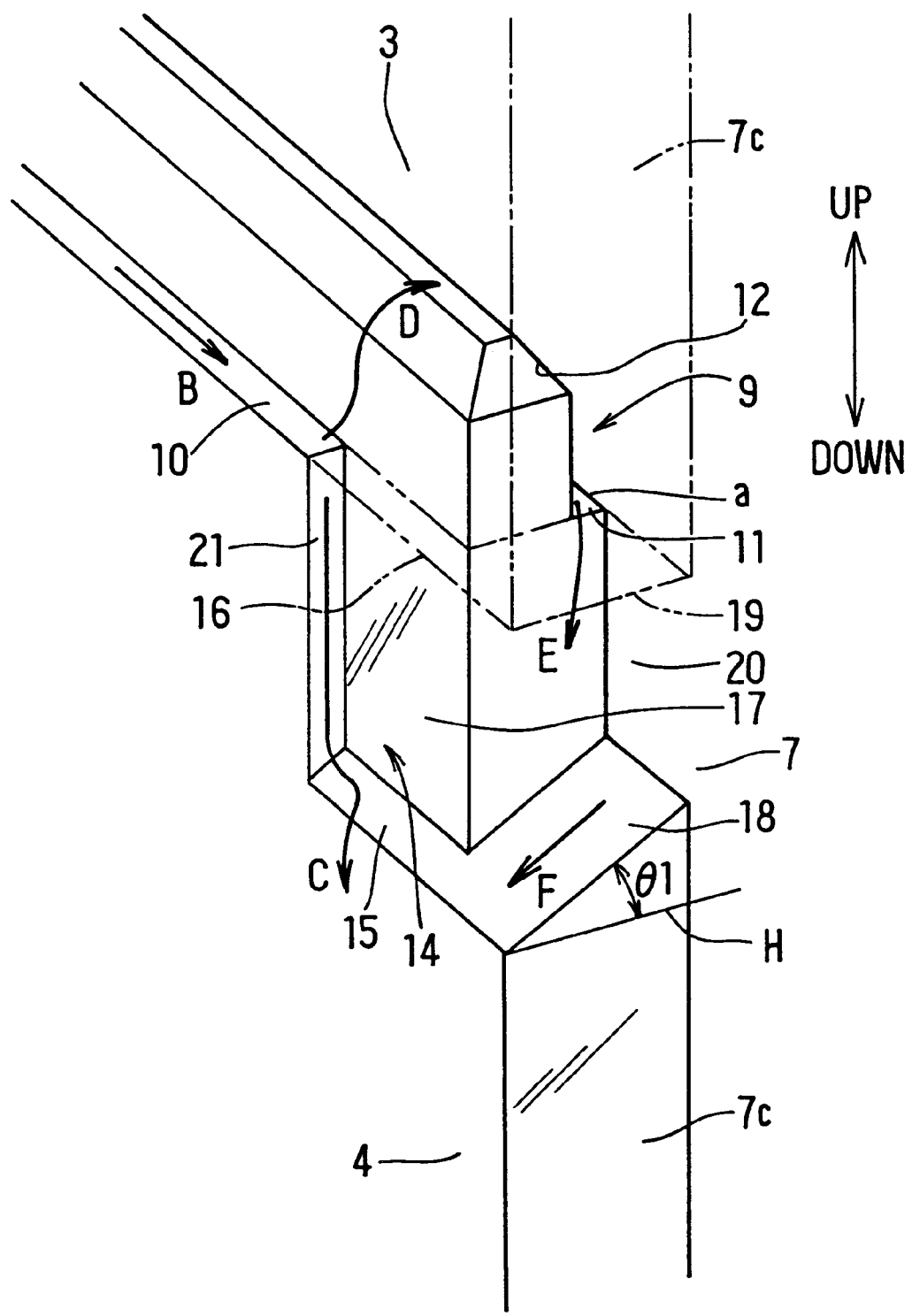
FIG. 2 is a detail perspective view of a step portion of a cooling casing of the cooling unit when viewed from allow A in FIG. 1.
Figure 3:
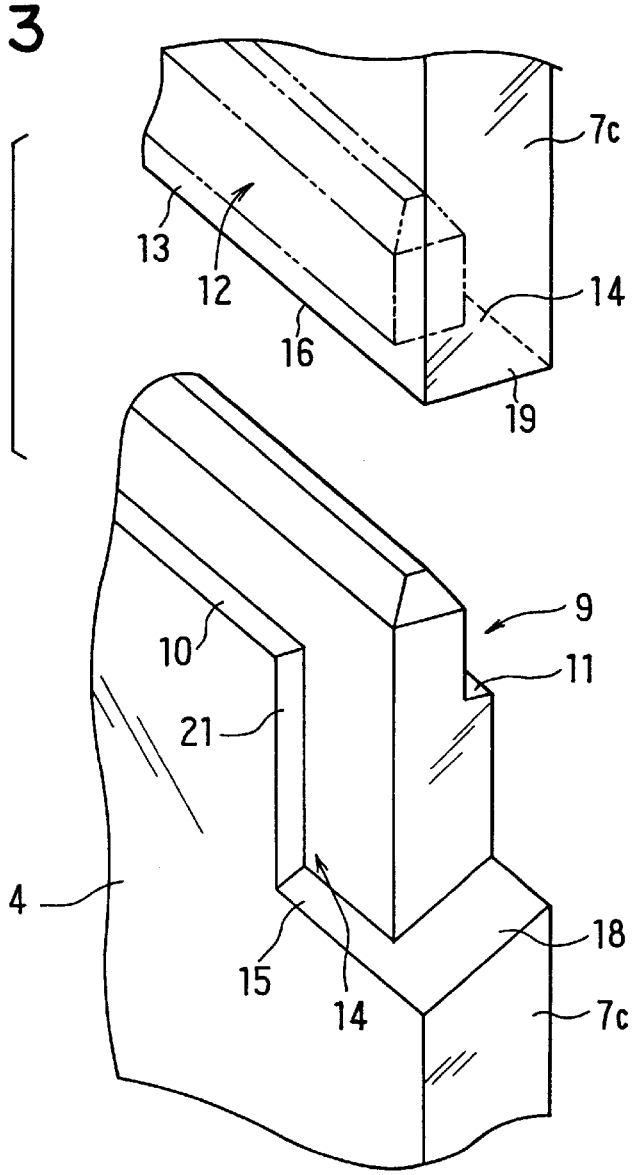
FIG. 3 is a disassemble view of the cooling casing in FIG. 2.

As shown in FIGS. 2, 3, a step portion 14 vertically downwardly stepped from the inside base end surface 10 is formed in the lower case 4 on an inside of the protrusion portion 9 at a position proximate to the opening portion 7. The step portion 14 has a first lower surface 15 at a lower side of the inside base end surface 10, and a vertical surface 21 connecting the inside base end surface 10 and the first lower surface 15. When the protrusion portion 9 is fitted to the insertion portion 12 when the upper case 3 and the lower case 4 are assembled, a space portion 17 is formed between the first lower surface 15 and a lower end surface 16 of the upper case 3 by the step portion 14. The lower end surface 16 is provided in the upper case 3 to be opposite to the first end surface 15. Because the step portion 14 is formed to be adjacent to the opening portion 7, the space portion 17 communicates with the opening portion 7 along the outer shape of the lower case 4.

In the first embodiment of the present invention, the lower case 4 does not have a contacting portion contacting a lower end surface 19 of the upper case 3, at the side of the opening portion 7. That is, a second surface 18 is formed in the lower case 4 at a lower side of the inside base end surface 10 adjacent to the opening portion 7. The second surface 18 is more adjacent to the opening portion 7 than the protrusion portion 9 and the first lower surface 15. Therefore, when the protrusion portion 9 and the insertion portion 12 are engaged so that the upper case 3 and the lower case 4 are assembled, a space portion 20 is formed between the second lower surface 18 and the lower end surface 19 of the upper case 3 opposite to the second lower surface 18.

As shown in FIG. 2, the second lower surface 18 is directly connected to the first lower surface 15, so that the second lower surface 18 and the first lower surface are placed on the same surface. In the first embodiment of the present invention, the first lower surface 15 and the second lower surface 18 are inclined downwardly toward the inside of the cooling casing by an inclination angle θ1 (e.g., 15° relative to a horizontal line H. Therefore, the second lower surface 18 is placed at an upper side of the first lower surface 15 on the same surface.

Next, operation of the step portion 14 provided in the lower case 4 will be now described. Air is cooled while passing through the evaporator 2, and water component contained in air is condensed so that condensed water is generated. Further, condensed water is also generated in the refrigerant pipe accommodated in the cooling casing of the cooling unit 1. In a case where refrigerant pipe is connected to the evaporator 2 after being inserted into the cooling casing from an upstream air side of the filter 8, condensed water may be introduced into a connection portion between the upper case 3 and the lower case 4, at an upstream air side of the opening portion 7. Therefore, in the first embodiment, the step portion 14 is provided at an upstream air side of the opening portion 7 for the filter 8.

Because air is blown in the cooling casing of the cooling unit 1 by the blower unit, air pressure inside the cooling casing becomes higher than air pressure outside the cooling casing. Therefore, condensed water may be firstly introduced into a clearance between the inside base end surface 10 and the inside contacting surface 13. Thereafter, condensed water is moved toward the opening portion 7 as shown by arrow B in FIG. 2 due to capillary-tube principle. However, according to the first embodiment of the present invention, the step portion 14 can prevent condensed water from extending toward the opening portion 7.

That is, as shown in FIG. 2, at the most adjacent side of the opening portion 7, the inside base end surface 10 is not provided on the inside of the protrusion portion 9. Therefore, the space portion 17 is formed between the lower end surface 16 of the upper case 3 and the first lower surface of the step portion 14. Thus, condensed water flowing in arrow B in FIG. 2 is introduced into the space portion 17 along the vertical surface 21 forming the step portion 14, and is reached onto the first lower surface 15, as shown by arrow C in FIG. 2. Because the first lower surface 15 is inclined toward the inside of the cooling casing, condensed water on the first lower surface 15 flows downwardly toward the inside of the cooling casing by itself weight. As a result, it can sufficiently prevent condensed water from being leaked to the outside of the cooling casing from the connection portion between the upper case 3 and the lower case 4.

As described above, according to the first embodiment of the present invention, the step portion 14 having a simple structure can prevent condensed water from being leaked to the outside of the cooling casing due to the capillary-tube principle.

Further, even when condensed water flows across the protrusion portion 9 as shown by arrow D in FIG. 2 and reaches to the outside base end surface 11, condensed water flows toward the opening portion 7 along the outside base end surface 11 as shown by arrow E in FIG. 2 due to the capillary-tube principle, and falls to the second lower surface 18. Because the second lower surface 18 is inclined downwardly toward the inside of the cooling casing, condensed water falls to the inside of the cooling casing with the itself weight. As a result, the cooling unit 1 can sufficiently prevent condensed water from being leaked to the outside of the cooling casing.

Condensed water within the cooling casing is discharged to the outside of the vehicle from a drain hole provided on the bottom of the cooling casing of the cooling unit 1.

According to the first embodiment of the present invention, the step portion 14 is provided at an upstream air side of the opening portion 7. However, the step portion 14 may be provided at a downstream air side of the opening portion 7, and may be provided at both of upstream and downstream air sides of the opening portion 7.

Figure 4:
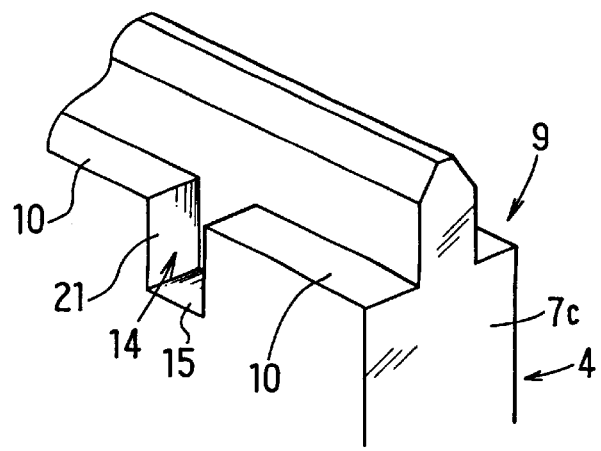
FIG. 4 is a perspective view showing a step portion of a cooling casing of a cooling unit according to a second preferred embodiment of the present invention.

A second preferred embodiment of the present invention will be now described with reference to FIG. 4. In FIG. 4, the components having functions similar to those in the first embodiment are indicated with the same reference numbers. In the above-described first embodiment, the step portion 14 is provided at the most adjacent side of the opening portion 7. However, in the second embodiment, as shown in FIG. 4, the step portion 14 is formed at a midway position of the inside base end surface 10 of the lower case 4. According to the second embodiment of the present invention, the step portion 14 having a simple structure can readily reduce condensed water to be leaked to the outside of the cooling casing due to the capillary-tube principle. In the second embodiment, the function of the step portion 14 is similar to that in the first embodiment, and the explanation thereof is omitted.

A third preferred embodiment of the present invention will be now described with reference to FIGS. 5 and 6. In the above-described first and second embodiments, the cooling unit 1 is constructed to prevent condensed water from being leaked from the connection portion between the upper case 3 and the lower case 4 due to the capillary-tube principle. In the third embodiment, it can also prevent condensed water, moved onto the inner wall surface of the cooling casing due to air blown by the blower unit, from being leaked to the outside of the cooling casing.

Figure 5:
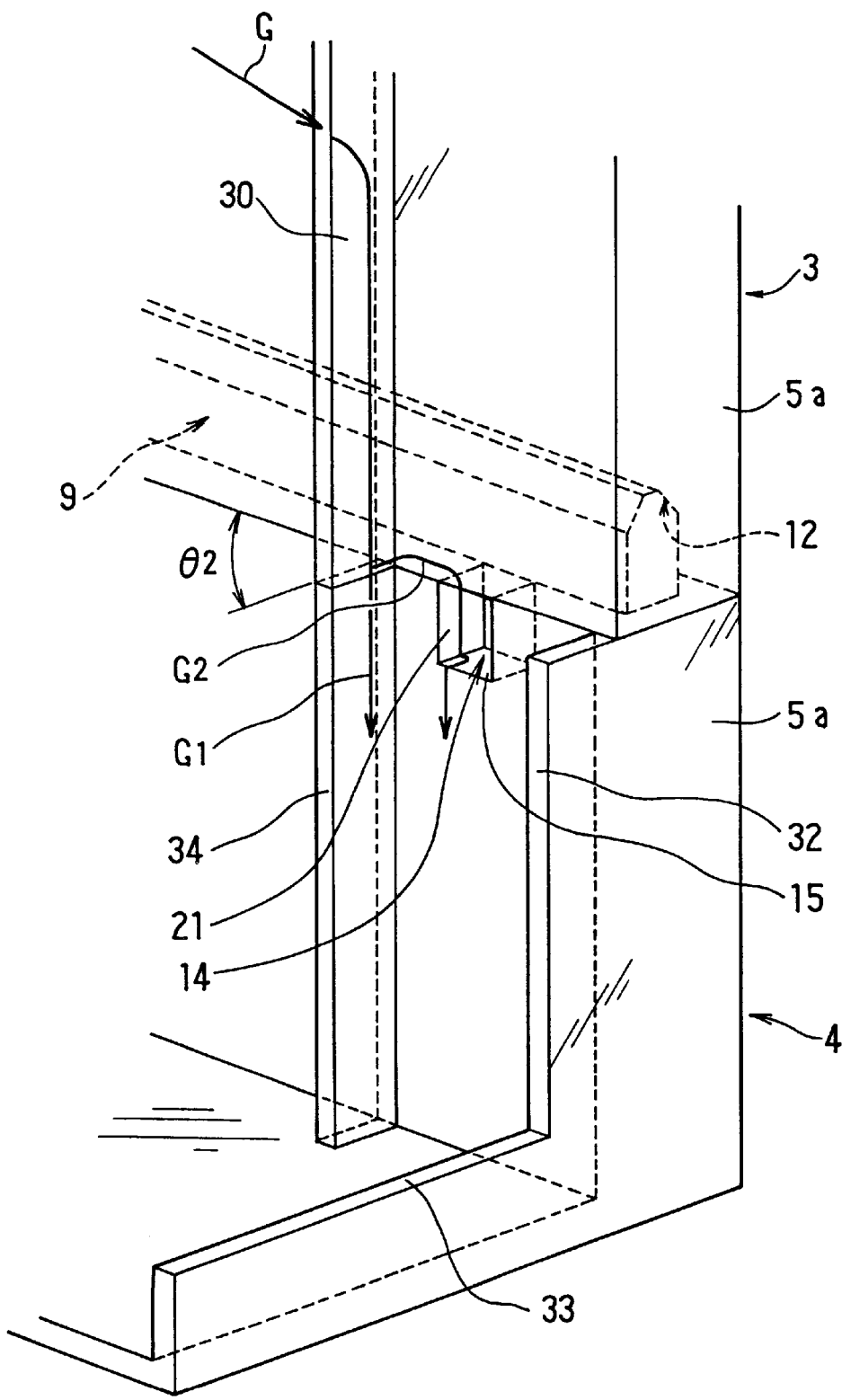
FIG. 5 is a perspective view showing a part of a cooling casing of a cooling unit when viewed from arrow H in FIG. 1, according to a third preferred embodiment of the present invention.

FIG. 5 is a perspective view of a cooling unit when viewed from arrow H in FIG. 1. As shown in FIGS. 5, 6, in the third embodiment, the structure for preventing condensed water from being leaked to the outside of the cooling casing due to the capillary-tube principle is similar to that of the second embodiment. In the third embodiment, guide portions 30–34 are newly provided, and the guide portions 30–34 can prevent condensed water from being leaked to the outside of the cooling casing at a position proximate to the opening portion 5.

Here, the opening portion 5 for connecting the cooling unit and the blower unit will be mainly described. Because distribution of air flow in the opening portion 5 is not uniform, a large whirl may be caused in the cooling unit 1. Therefore, a part of condensed water in the cooling casing of the cooling unit may be moved toward the opening portion 5 by the air flow after being transmitted onto the inner wall surface of the cooling casing of the cooling unit, and may be leaked to the outside of the cooling casing.

Figure 6:
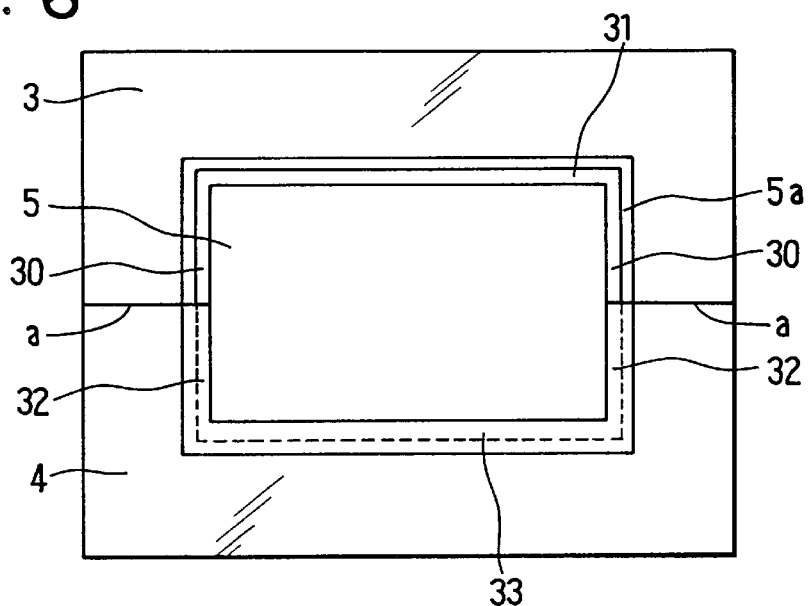
FIG. 6 is a front view of the cooling casing according to the third embodiment.
Figure 7:
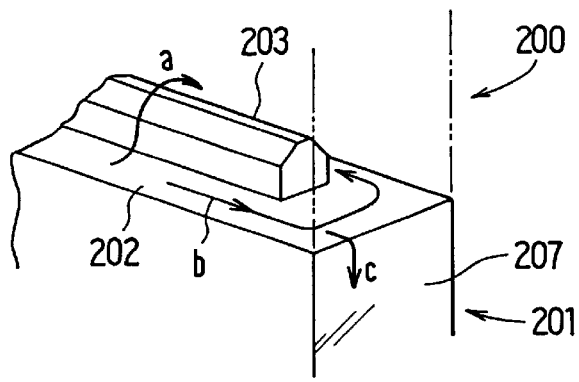
FIG. 7 is a diagrammatic view showing a part of cooling casing experimentally performed by the inventors of the present invention.
Figure 8:
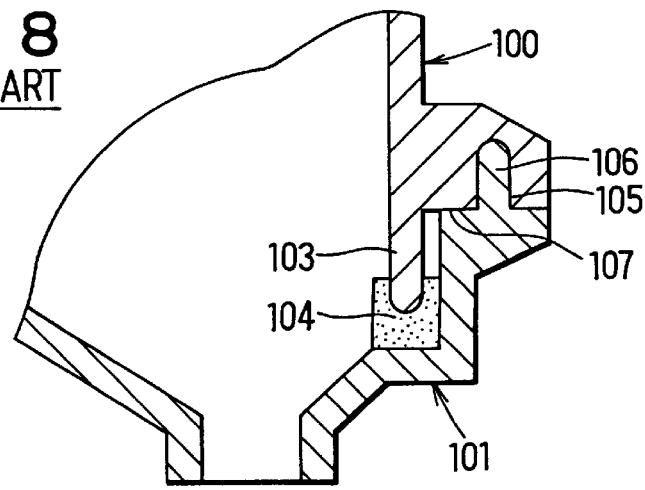
FIG. 8 is a sectional view showing an assembling structure of a conventional cooling casing.

As shown in FIGS. 5, 6, a first guide portion 30, 31 protruding from the inner wall surface of the upper case 3 to the inside of the cooling casing is formed integrally with the upper case 3. The first guide portion 30, 31 includes a first vertical guide 30 extending from an upper end to a lower end of the opening portion 5 in the upper case 3 in the up-down direction, and a first lateral guide 31 connecting the first vertical guide 30 at an upper end of the first vertical guide 30. The first guide portion 30, 31 are disposed adjacent to an opening periphery 5a of the opening portion 5. A lower end of the first vertical guide 30 is adjacent to the step portion 14 to be placed between the evaporator 2 and the step portion 14.

On the other hand, a second guide portion 32, 33 and a third vertical guide 34 are formed integrally with the lower case 4. The second guide portion 32, 33 is disposed on the same surface as the opening periphery 5a of the opening portion 5. The second guide portion 32, 33 includes a second vertical guide 32 disposed at left and right sides in FIG. 6, and a second lateral guide 33 connecting the second vertical guide 32 at a lower end of the second vertical guide 32. The third guide 34 extends from an upper end to the lower end of the opening portion 5 in the lower case 4, and is disposed at both right and left sides in FIG. 6. An upper end of the third vertical guide 34 is connected to the lower end of the first vertical guide 30. In the third embodiment, the step portion 14 is provided between the second vertical guide 33 and the third vertical guide 34. Each protruding length of the guides 30–34 from the inner wall surface of the cooling casing is set in a range of 3–10 mm to sufficiently guide condensed water. More preferably, each protruding length of the guides 30–34 is set in a range of 5–7.5 mm. Further, the guides 30–34 protrude vertically relative to the inner wall surface of the cooling casing. That is, angle θ2 indicated in FIG. 5 is 90°.

Next, operation of the cooling unit according to the third embodiment will be now described. Similarly to the second and third embodiments, condensed water to be leaked to the outside of the cooling casing due to the capillary-tube principle can be restricted by the step portion 14. On the other hand, condensed water moved toward the opening portion 5 due to blown-air is introduced to the bottom of the cooling casing as the following method. As shown in FIG. 5, flow G of condensed water toward the inner wall surface of the upper case 3 is not moved into the opening portion 5 by the first vertical guide 30. That is, condensed water flowing as shown by arrow G in FIG. 5 contacts a wall surface of the first vertical guide 30 at a side of the evaporator 2, and is moved downwardly along the wall surface of the first vertical guide 30 while being guided by the first vertical guide 30. A part of the condensed water guided by the first vertical guide 30 and reached to the connection portion between the upper and lower cases 3, 4 is moved further downwardly along the third vertical guide 34 by itself weight, and the other part thereof flows as shown by arrow G2 in FIG. 5 and is moved downwardly by the step portion 14. Condensed water reached to the first lateral guide 31 through the inner water surface of the upper case 3 falls downwardly within the cooling casing. Because a large amount of condensed water moving toward the first lateral guide 31 falls downwardly by itself weight before reaching to the first lateral guide 31, the first lateral guide 31 may be omitted in the third embodiment.

Condensed water moved onto the inner wall surface of the lower case 4 does not flow into the opening portion 5 by the second vertical guide 32 and the third vertical guide 34, and is moved downwardly while being guided by the second and third vertical guides 32, 34. That is, the second vertical guide 32 and the third vertical guide 34 interrupt condensed water flowing toward the opening portion 5.

Condensed water joined into a bottom side of the lower case 4 is interrupted by the second guide 33, and is not moved into the opening portion 5. As a result, condensed water joined into the bottom of the lower case 4 is discharged to the outside of the vehicle from the drain hole.

In the third embodiment, the second guide portion 32, 33 may be not provided on the same surface as the opening periphery 5a of the opening portion 5. That is, the second guide portion 32, 33 may be provided at an any position between the step portion 14 and the opening periphery 5a of the opening portion 5. Further, the third vertical guide 34 may be omitted at both of the right and left sides of the opening portion 5, and may be provided at only one side of the opening portion 5. Further, it is not necessary for the third vertical guide 34 to extend to the lower end of the opening portion 5, and the third vertical guide 34 may extend to a predetermined position in the up-down direction. Even when the structure and the shape of the third vertical guide 34 are changed or even when the third vertical guide is omitted, condensed water on the inner wall surface of the lower case 4 is guided by the second vertical guide 32 to be moved downwardly.

Further, the angle θ2 between each surface of the guides 30–34 at the side of the evaporator 2 and the inner wall surface of the cooling casing may be set to an acute angle. By setting the angle θ2 to an acute angle, the condensed water flowing across the guides 30–34 can be further restricted.

Although the present invention has been fully described in connection with preferred embodiments thereof with reference to the accompanying drawings, it is to be noted that various changes and modifications will become apparent to those skilled in the art.

For example, in the above-described first and second embodiments, the step portion 14 is formed in the cooling casing adjacent to the opening portion 7 for inserting the filter 8. However, the step portion 14 in the first and second embodiments may be applied to the opening portion 5 or the opening portion 7.

In the above-described third embodiment, the step portion 14 and the guides 30–34 are provided adjacent to the opening portion 5. However, the step portion 14 and the guides 30–34 of the third embodiment may be provided adjacent to the opening portion 7 for inserting the filter 8 or the opening portion 6. When the guides 30–34 in the third embodiment are used for the opening portion 7 for inserting the filter 8, the first and second lateral guides 31, 33 are not necessary. Further, in the above-described third embodiment, the step portion 14 may have the structure similar to that in the above-described first embodiment.

Such changes and modifications are to be understood as being within the scope of the present invention as defined by the appended claims.

What is claimed is:

1. An air conditioner comprising:

a cooling casing for forming an air passage through which air flows, said cooling casing being composed of upper and lower cases which are detachably connected to each other in an up-down direction on a connection portion therebetween; and a cooling heat exchanger, accommodated within said cooling casing, for cooling air in said air passage, wherein:

said cooling casing has an opening portion through which an inside of said cooling casing communicates with an outside of said cooling casing, said opening portion being formed when the said upper and lower cases are assembled;

said lower case has a first end surface on said connection portion at the inside of said cooling casing, and a protrusion portion protruding toward said upper case from said first end surface;

said upper case has a second end surface contacting said first end surface at an inside of said protrusion portion on said connection portion, and a recess portion into which said protrusion portion is fitted; and said lower case has a step portion downwardly stepped from said first end surface on the inside of said protrusion portion at a position proximate to said opening portion.

2. The air conditioner according to claim 1, wherein:

said cooling heat exchanger is disposed in said cooling casing so that air passing through said cooling heat exchanger is cooled and condensed water is generated; and said step portion is provided in said lower case to prevent the condensed water between said first end surface and said second end surface from flowing into said opening portion.

3. The air conditioner according to claim 2, wherein:

said step portion has a first lower surface provided at a lower side of said first end surface, and a vertical surface connecting said first end surface and said first lower surface; and said step portion is formed on the inside of said cooling casing so that a first space is formed between said second end surface of said upper case and said first lower surface when said upper and lower cases are assembled.

4. The air conditioner according to claim 3, wherein said step portion is provided in said lower case adjacent to said opening portion so that said first space communicates with said opening portion.

5. The air conditioner according to claim 3, wherein said vertical surface of said step portion is inclined relative to the up-down direction between said first end surface and said first lower surface.

6. The air conditioner according to claim 3, wherein said first lower surface of said step portion is inclined downwardly toward the inside of said cooling casing.

7. The air conditioner according to claim 3, wherein said step portion is formed at a midway position of said first end surface in said lower case.

8. The air conditioner according to claim 4, wherein:

said lower case has a second lower surface on the same surface as said first lower surface;

said second lower surface is more adjacent to said opening portion, than said protrusion portion and said first lower surface;

said second lower surface is opposite to said second end surface of said upper case to form a second space therebetween; and said second space communicates with both of said first space and said opening portion.

9. The air conditioner according to claim 8, wherein said second lower surface is positioned at an upper side of said first lower surface so that said first lower surface and said second lower surface are continually inclined downwardly toward the inside of said cooling casing.

10. The air conditioner according to claim 1, wherein:

said upper case has upper and lower ends in the up-down direction, and a first vertical guide protruding from an inner wall surface of said upper case to extend from said upper end to said lower end of said upper case;

said first vertical guide is disposed between said cooling heat exchanger and said step portion in a lateral direction perpendicular to the up-down direction;

said lower case has upper and lower ends in the up-down direction, and a second vertical guide protruding from an inner wall surface of said lower case to extend from said upper end to said lower end of said lower case; and said second vertical guide is disposed to be more adjacent to said opening portion, than said step portion, in the lateral direction.

11. The air conditioner according to claim 10, wherein said step portion is disposed between said first vertical guide and said second vertical guide in the lateral direction.

12. The air conditioner according to claim 10, wherein:

said lower case has a third vertical guide protruding from an inner wall surface of said lower case to extend from said upper end to said lower end of said lower case; and said third vertical guide is arranged on the same position as said first vertical guide in the lateral direction.

13. The air conditioner according to claim 10, wherein:

said lower case has a horizontal guide protruding from an inner bottom surface of said lower case; and said horizontal guide is connected to said second vertical guide.

14. The air conditioner according to claim 1, further comprising an air blowing unit for blowing air into said cooling casing, wherein said air blowing unit has a first unit case being connected to said cooling casing at said opening portion.

15. The air conditioner according to claim 1, further comprising a heating unit for heating air, wherein said heating unit has a second unit case being connected to said cooling casing at said opening portion.

16. The air conditioner according to claim 1, further comprising a filter for filtering dust contained in air, wherein said filter is inserted into said cooling casing from said opening portion.

17. A cooling unit for an air conditioner for a vehicle having a passenger compartment, said cooling unit comprising:

a cooling casing for forming an air passage through which air flows, said cooling casing being composed of upper and lower cases which are detachably connected to each other in an up-down direction on a connection portion therebetween; and a heat exchanger for cooling air to be blown into the passenger compartment, said heat exchanger being disposed within said cooling casing so that air passing therethrough is cooled and condensed water is generated, wherein:

said cooling casing has an opening portion through which an inside of said cooling casing communicates with an outside of said cooling casing, said opening portion being formed when the said upper and lower cases are assembled;

said lower case has a first end surface on said connection portion at the inside of said cooling casing, and a protrusion portion protruding toward said upper case from said first end surface;

said upper case has a second end surface contacting said first end surface on said connection portion, and a recess portion into which said protrusion portion is inserted;

said lower case has a step portion downwardly stepped from said first end surface on the inside of said protrusion portion at a position proximate to said opening portion; and said step portion is provided in said lower case so that a space is defined by said second end surface of said upper case and said step portion.

18. The cooling unit according to claim 17, wherein:

said upper case has upper and lower ends in the up-down direction, and a first vertical guide protruding from an inner wall surface of said upper case to extend from said upper end to said lower end of said upper case;

said first vertical guide is disposed between said cooling heat exchanger and said step portion in a lateral direction perpendicular to the up-down direction;

said lower case has upper and lower ends in the up-down direction, and a second vertical guide protruding from an inner wall surface of said lower case to extend from said upper end to said lower end of said lower case; and said second vertical guide is disposed to be more adjacent to said opening portion, than said step portion, in the lateral direction.

19. An air conditioner comprising:

a cooling casing for forming an air passage through which air flows, said cooling casing being composed of upper and lower cases which are detachably connected to each other in an up-down direction on a connection portion therebetween; and a heat exchanger, accommodated within said cooling casing, for cooling air in said air passage, wherein:

said cooling casing has an opening portion through which an inside of said cooling casing communicates with an outside of said cooling casing, said opening portion being formed when the said upper and lower cases are assembled;

said upper case has a first vertical guide protruding from an inner wall surface of said upper case to extend in the up-down direction;

said first vertical guide is disposed between said cooling heat exchanger and said opening portion in a lateral direction perpendicular to the up-down direction to be proximate to said opening portion;

said lower case has a second vertical guide protruding from an inner wall surface of said lower case to extend in the up-down direction; and said second vertical guide is disposed to be more adjacent to said opening portion, than said first vertical guide, in the lateral direction.

20. The air conditioner according to claim 19, wherein:

said lower case has a third vertical guide protruding from an inner wall surface of said lower case to extend in the up-down direction; and said third vertical guide is arranged on the same position as said first vertical guide in the lateral direction.

* * * * *